(12) United States Patent
Jin et al.

(10) Patent No.: US 10,075,693 B2
(45) Date of Patent: Sep. 11, 2018

(54) EMBEDDING CALIBRATION METADATA INTO STEREOSCOPIC VIDEO FILES

(71) Applicants: Han Jin, Milpitas, CA (US); Adam Rowell, Palo Alto, CA (US)

(72) Inventors: Han Jin, Milpitas, CA (US); Adam Rowell, Palo Alto, CA (US)

( * ) Notice: Subject to any disclaimer, the term of this patent is extended or adjusted under 35 U.S.C. 154(b) by 137 days.

(21) Appl. No.: 15/139,328

(22) Filed: Apr. 27, 2016

(65) Prior Publication Data

US 2016/0330430 A1    Nov. 10, 2016

Related U.S. Application Data

(60) Provisional application No. 62/154,703, filed on Apr. 29, 2015, provisional application No. 62/328,011, filed on Apr. 27, 2016.

(51) Int. Cl.
*H04N 15/00*    (2006.01)
*H04N 13/00*    (2018.01)
*H04N 13/02*    (2006.01)

(52) U.S. Cl.
CPC ..... *H04N 13/0066* (2013.01); *H04N 13/0239* (2013.01); *H04N 13/0246* (2013.01)

(58) Field of Classification Search
USPC ............................................. 348/42, 43, 48
See application file for complete search history.

(56) References Cited

U.S. PATENT DOCUMENTS

| | | | |
|---|---|---|---|
| 9,338,447 B1* | 5/2016 | Crump | G06T 7/80 |
| 2012/0092232 A1* | 4/2012 | Burnett | G06F 3/1438 |
| | | | 345/1.1 |
| 2015/0172633 A1* | 6/2015 | Nobori | H04N 5/23238 |
| | | | 348/36 |
| 2015/0331485 A1* | 11/2015 | Wilairat | G02B 27/0172 |
| | | | 345/156 |

* cited by examiner

*Primary Examiner* — Chikaodili E Anyikire

(57) ABSTRACT

A computerized system for displaying stereoscopic three-dimensional (3D) video recorded on a stereoscopic camera device includes a computer store containing data. The data includes a stereoscopic video feed of two or more stereoscopic images from a stereoscopic video capture device, wherein the stereoscopic video feed comprises a plurality of contemporaneous metadata feeds, wherein a metadata feed comprises a time sequenced set of metadata obtained from a sensor of the stereoscopic video capture device. The computerized system includes a computer processor in the stereoscopic video capture device, which computer processor is coupled to the computer store and programmed to obtain the stereoscopic video feed from the computer store, parse the plurality of contemporaneous metadata feeds from the stereoscopic video feed, and calibrate the stereoscopic video feed for display in a display of a user's computing device using the plurality of contemporaneous metadata feeds.

12 Claims, 11 Drawing Sheets

EMBEDDING CALIBRATION METADATA INTO STEREOSCOPIC VIDEO FILES

CROSS-REFERENCE TO RELATED APPLICATIONS

This application is a claims priority from provisional U.S. Application No. 62/154,703 filed 29 Apr. 2015. This application is hereby incorporated by reference in its entirety. This application is a claims priority from provisional U.S. Application No. 62/328,011 filed 26 Apr. 2016. This application is hereby incorporated by reference in its entirety.

FIELD OF THE INVENTION

The invention is in the field of digital video technology and more specifically to a method, system and apparatus of methods and systems of embedding calibration metadata into stereoscopic video files.

DESCRIPTION OF THE RELATED ART

A stereoscopic 3D video camera may consist of two or more image sensors fitted with one lens per sensor. Each of the Image sensors and lenses have associated parameters, such as the sensor size and resolution, the lens focal lengths, and lens distortion parameters. The parameters of each image sensor and lens may be unique, and are often determined through a stereoscopic camera calibration process. Additionally, the camera may have additional sensors, such as a gyroscope, accelerometer, or GPS device to record information related to the movement or position of the camera.

During the capture process, the image sensors record video frames, and the stereoscopic camera combines the frames from the individual image sensors into a composite video file. The video frames may be processed prior to being encoded into the video file, with additional image processing parameters describing the processing.

To play back a stereoscopic 3D video, a stereoscopic video player can be used, such as a virtual reality ("VR") headset or a mobile phone fitted with a stereoscopic display adapter. Each of the stereoscopic frames is processed by the player, which may additionally require the parameters associated with the camera that captured the frames. For example, the player may require knowing the camera's image sensor and calibration parameters to properly render the stereoscopic frames. If the video frames were processed by the camera prior to being encoded into the video file, the player may also utilize the parameters of the image processing algorithms that processed the frames.

It is desirable to embed the camera, sensor, and processing parameters directly into the video file recorded by the stereoscopic camera at the time of capture. Some of these parameters may be fixed for the duration of the video, such as image sensor and calibration parameters, whereas some parameters may change during the recording process, such as accelerometer, gyroscope, and GPS sensor readings.

Additionally, it is desirable that a player can read and process a video file that has been generated using the captured video of different stereoscopic cameras. For example, two users with different stereoscopic cameras may record scenes with their own devices, and then concatenate their respective videos into a single video file. In such a case, the stereoscopic video player will need to be able to associate different portions of the composite video file with different camera parameters, including different lens distortion parameters and image sensor parameters.

Accordingly, there is a need for a system or method that can embed the camera and sensor parameters into the video file captured by a stereoscopic 3D camera. Parameters will be either set once per the entirety of the file, or changed for each frame of the video. Additionally, there is a need for a system or method that can process such a stereoscopic 3D video file and decode the parameters, either set for the entirety of the file, or on a per frame basis. Such a system or method could then utilize the parameters during the playback of the video file.

BRIEF SUMMARY OF THE INVENTION

In one aspect, a computerized system for displaying stereoscopic three-dimensional (3D) video recorded on a stereoscopic camera device includes a computer store containing data. The data includes a stereoscopic video feed of two or more stereoscopic images from a stereoscopic video capture device, wherein the stereoscopic video feed comprises a plurality of contemporaneous metadata feeds, wherein a metadata feed comprises a time sequenced set of metadata obtained from a sensor of the stereoscopic video capture device. The computerized system includes a computer processor in the stereoscopic video capture device, which computer processor is coupled to the computer store and programmed to obtain the stereoscopic video feed from the computer store, parse the plurality of contemporaneous metadata feeds from the stereoscopic video feed, and calibrate the stereoscopic video feed for display in a display of a user's computing device using the plurality of contemporaneous metadata feeds.

Figure 1:
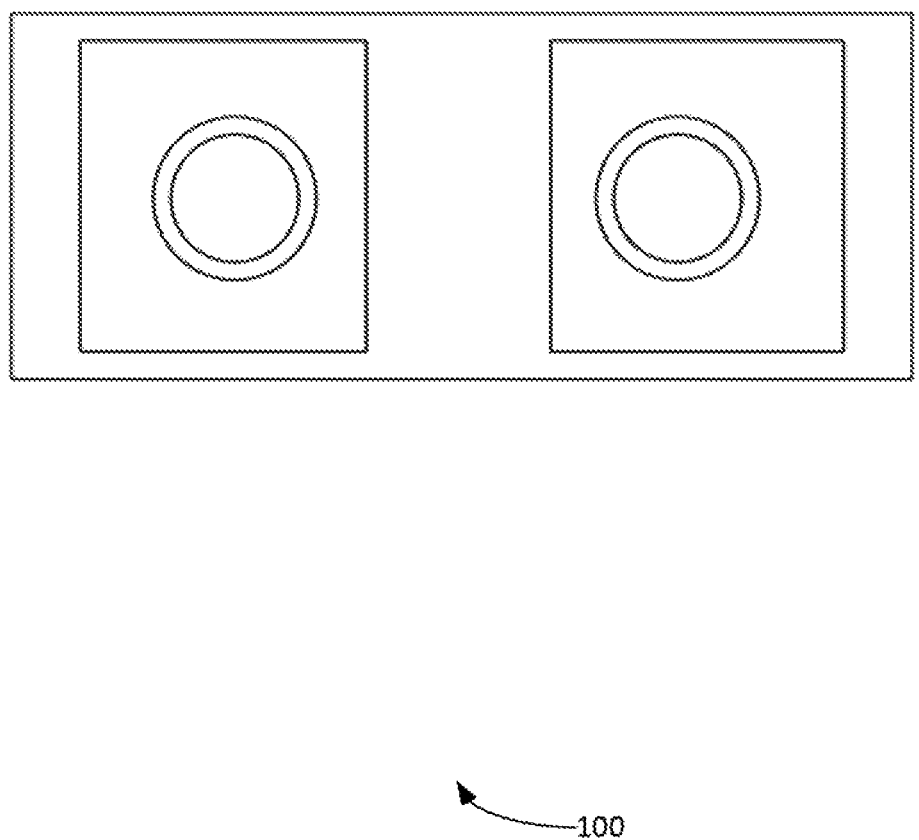
FIG. 1 depicts a front side perspective of a stereoscopic camera system, according to some embodiments.
Figure 2:
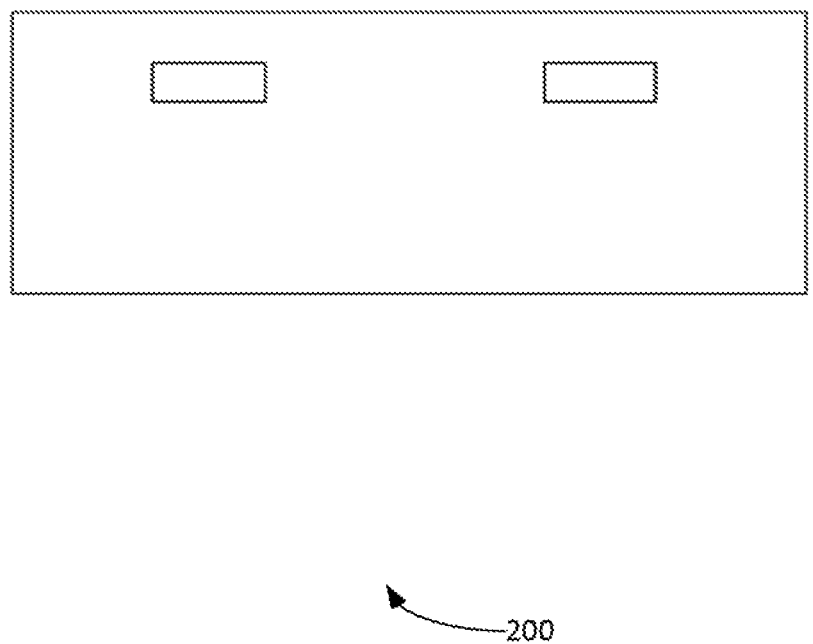
FIG. 2 is a backside view of a stereoscopic camera system, according to some embodiments.
Figure 3:
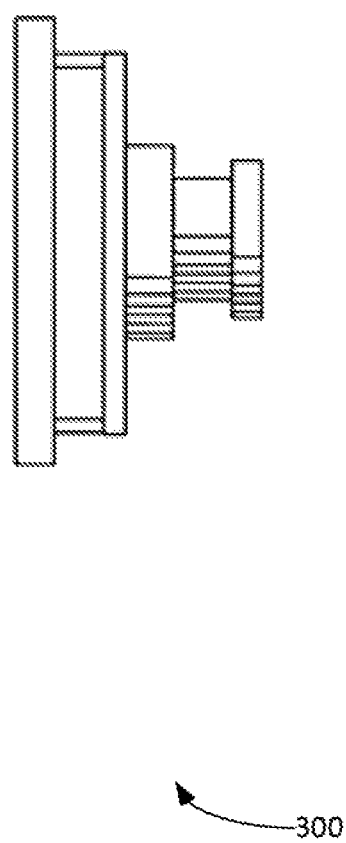
FIG. 3 is a right side view of a stereoscopic camera system, according to some embodiments.
Figure 4:
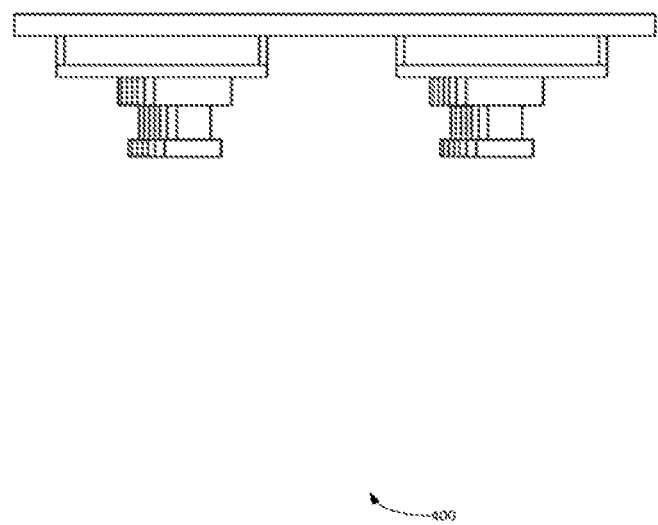
FIG. 4 is a top view of a stereoscopic camera system, according to some embodiments.

The Figures described above are a representative set, and are not an exhaustive with respect to embodying the invention.

DESCRIPTION

Disclosed are a system, method, and article of embedding calibration metadata into stereoscopic video files. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

3-D audio can be a group of sound effects that manipulate the sound produced by stereo speakers, surround-sound speakers, speaker-arrays, or headphones.

Three-dimensional stereoscopic video (3D film video) can a digital motion picture that enhances the illusion of depth perception, hence adding a third dimension.

Fisheye cameras can utilize an ultra-wide-angle lens that produces a visual distortion intended to create a wide panoramic or hemispherical image.

Head-mounted display (or helmet-mounted display, for aviation applications), both abbreviated HMD, is a display device, worn on the head.

Inertial measurement unit (IMU) can be an electronic device that measures and reports a body's specific force, angular rate, and/or the magnetic field surrounding the body, using a combination of accelerometers and gyroscopes, sometimes also magnetometers.

MPEG-4 Part 14 (MP4) is a digital multimedia format most commonly used to store video and audio, but can also be used to store other data.

Stereoscopy can be a technique for creating or enhancing the illusion of depth in an image by means of stereopsis for binocular vision. Stereoscopic video can be coded in various processing stages used to manifest stereoscopic content. Various techniques can be used to achieve stereoscopic video, inter alia: color shifting (e.g. anaglyph, etc.); pixel subsampling (e.g. side-by-side, checkerboard, quincunx, etc.); enhanced video stream coding (e.g. 2D+Delta, 2D+Metadata, 2D plus depth, etc.); etc.

Universal Serial Bus (USB) can be a protocol that define the cables, connectors and communications protocols used in a bus for connection, communication and/or power supply between computers and electronic devices.

Virtual Reality (VR) can include immersive multimedia that replicates an environment that simulates physical presence in places in the real world or imagined worlds.

Example Computing Systems

Various embodiments can use an electrical device. It is a stereoscopic camera that captures one-hundred and eighty (180)-degree 3D images and videos by using two fish-eye lenses spaced apart at a distance similar to that of human eyes. The stereoscopic camera system can include the following elements, inter alia: two printed circuit boards (PCBs), each consisting of a digital image sensor and supporting electronics that capture images at a rate of thirty (30) frames per second; two fish-eye lenses use for the image sensors to capture images with a one-hundred and eighty (180)-degree field-of-view; a fixture to mount and position the centers of the two image sensors and lenses at a distance of two point five (2.5) inches from each other; a laptop (and/or other computing devices) with digital storage and software to store and replay the image streams; two USB three-point-zero (3.0) cables that connect the image sensor PCBs to a USB hub; a USB hub to connect and synchronize the image sensor PCBs with the laptop; two USB three three-point-zero (3.0) outlets to connect the image sensor PCBs to the USB hub; screws to mount the image sensor PCBs onto the fixture; etc.

The compact stereoscopic camera uses two fish-eye lenses to simultaneously capture video streams from two different perspectives, each with a one-hundred and eighty (180)-degree field of view. By using specialized software and a virtual reality headset, the photos and videos captured by the camera can be played back, giving the user a realistic illusion of being immersed into the video or image. With this set-up, the user can use natural head motions to look freely in different directions, at different parts of the image or video within the one-hundred and eighty (180)-degree wide field. Accordingly, the stereoscopic camera can capture two images with a very large field of view. The camera does not need to combine multiple images into one, since the two images are shown separately to the user's eyes. In this way, visible seams between two images are avoided as the two image can be combined into a single image feed. Capturing two images instead of one and showing the two images to the individual eyes of the consumer creates an impression of the three-dimensionality of the captured image. Together with the field-of-view that Is larger than the field-of-view of human vision, this can create a sense of presence in the consumer of the captured videos or photos. In comparison to camera systems that require more than two cameras, the invention is smaller, lighter and cheaper to produce.

Various views of an example stereoscopic camera are provided in FIGS. 1-4. It is noted that the illustrated size parameters are provided by way of example and not limitation. Other stereoscopic cameras systems can be implemented with other example size parameters.

In one example, an example stereoscopic camera system can include a camera prototyped with two fish-eye lenses at a horizontal distance of two point five (2.5) inches mounted on two image sensor PCBs with screws on a fixture which may be made of any sufficiently rigid and strong material such as high-strength plastic, metal, or the like. Both lenses are arranged in a way that they are parallel to each other, perpendicular to the mounting fixture, and face the same direction. The centers of the image sensor PCBs can be at the same two-point-five (2.5) inches distance from each other as the lenses. Both PCBs can have USB 3.0 ports and are connected through USB cables to a USB hub that combines the signals and forwards the image streams to the laptop for processing and storage.

The two camera fish-eye lenses capture individual Image streams with a field-of-view of one-hundred and eighty (180) degrees and send them to the laptop. When the laptop receives these images or streams of images, it directly stores them on its storage, in a form that associates, or synchronizes images from the two image sensors that were captured at the same moment.

To summarize the construction details of the prototype, two fish-eye lenses are each mounted on an image sensor PCB, creating individual camera prototypes. The two PCBs are then mounted on a fixture with screws, so they are in the physical configuration described above. The image sensor PCBs are connected through USB cables and a USB hub to the laptop. The laptop runs the software that records raw images and processes them for play back.

All described elements are necessary for the invention to work. To add additional functionalities, first, one or multiple microphones could be added to capture sound from multiple directions alongside the video stream. Second, the laptop can be replaced by a mobile phone and connected to the prototype to make the entire system more portable and cost-efficient in terms of components or stand-alone functions.

A use case for this invention would be to place the prototype somewhere or mount it to some object, facing the direction of the object or space to be recorded or taken as photos. Then run the software on the computer to capture either a video or photo of the objects in the field-of-view of the invention. Finally, the invention produces digital videos or photos with a 3D one-hundred and eighty (180)-degree view after raw frames are processed through the software on the computer.

The advantages of the present invention include, without limitation, that it is portable, exceedingly easy to transport, and allows simple capture of one-hundred and eighty (180)-degree 3D videos and photos with a traditional point-and-shoot method. It is easy to adjust and move the lightweight invention while video recording. Moving current devices typically requires more than just point-and-shoot, as three-hundred and sixty (360) panoramic stereoscopic cameras captures everything around them. Further, the invention creates videos that can be viewed through virtual reality headsets.

In broad embodiment, the present invention is a portable and user-friendly stereoscopic camera capturing one-hundred and eighty (180)-degree 3D videos by reducing current market solutions to the bare minimum and mimicking human vision and hearing.

Figure 5:
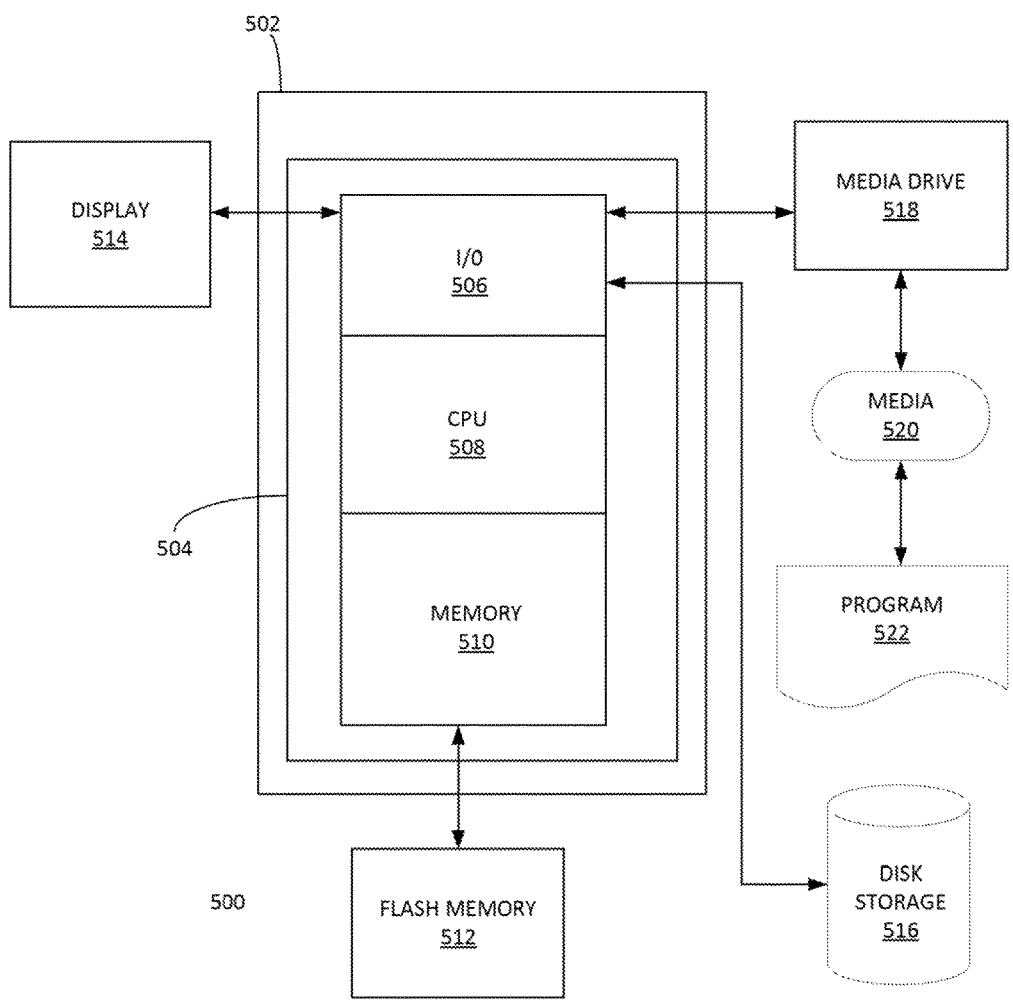
FIG. 5 is a block diagram of a sample-computing environment that can be utilized to implement various embodiments.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 6:
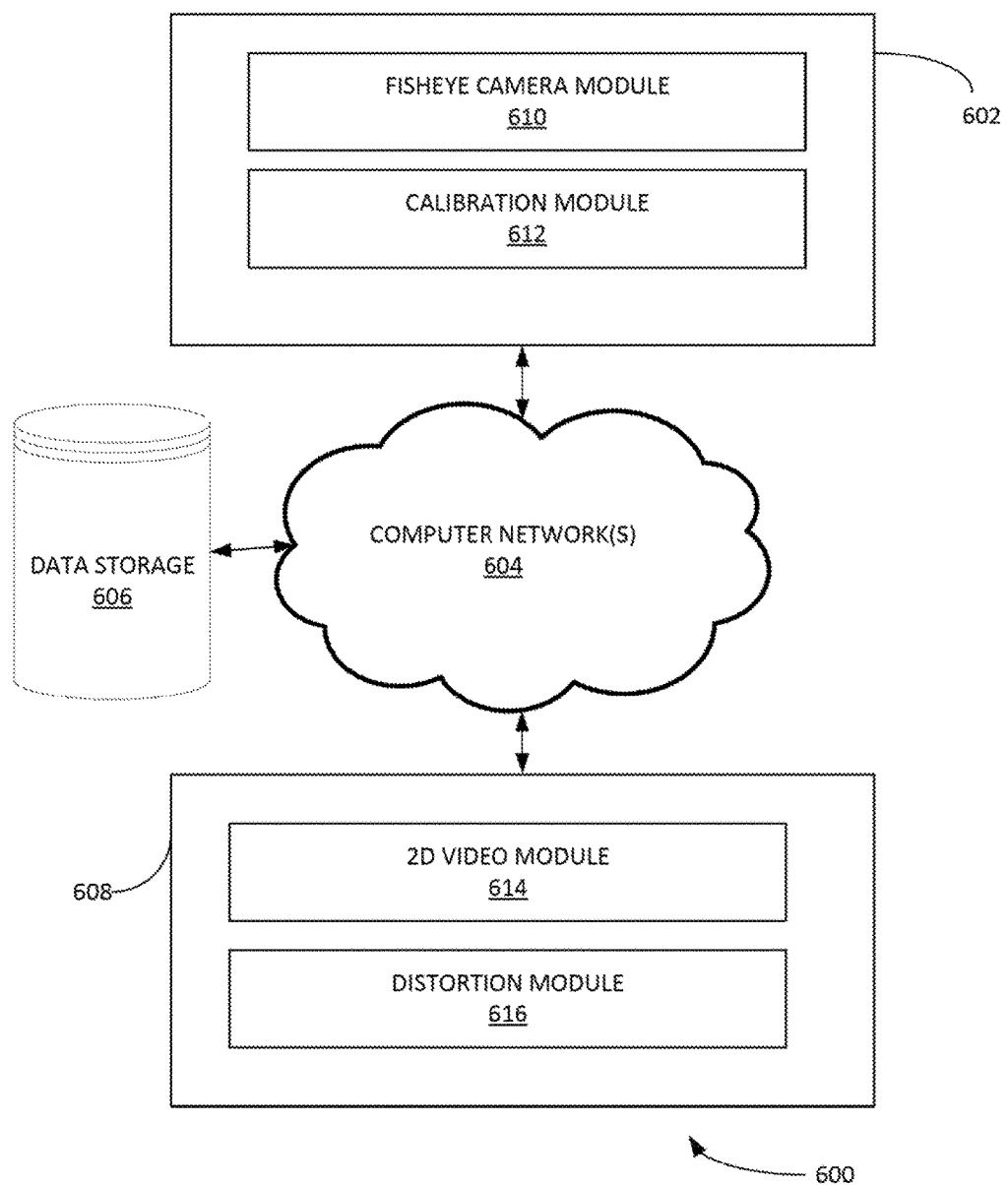
FIG. 6 illustrates an example system, according to some embodiments.

FIG. 6 illustrates an example system 600, according to some embodiments. System 600 can capture stereoscopic videos with fisheye lenses and then render said videos for playback with 3-D effects in a virtual-reality device. System 600 can include stereoscopic device 602. In one example, the stereoscopic device 602 can include the systems of FIGS. 1-4. Stereoscopic device can include fisheye-camera module 610 and calibration module 612. Fisheye-camera module 610 can include fisheye lens camera and their software/firmware for managing said camera systems. Calibration module 612 can obtain calibration information and/or other metadata that can be used by a graphics engine (e.g. graphics engine 608) to render the videos obtained by stereoscopic device 602 into an appropriate format for playing a 3-D effect video in a virtual-reality device.

Graphics engine 608 can be included in a virtual-reality device, remote server entity, stereoscopic system, user computing device, etc. Graphics engine 608 can include functionalities that render the videos obtained by stereoscopic device 602 into an appropriate format for playing a 3-D effect video in a virtual-reality device. For example, graphics engine 608 can include 2-D video module 614 and distortion module 616. 2-D video module 614 render a video obtained by two fisheye lenses into two 2-D videos. Distortion module 616 can then re-distort the two 2-D video into an appropriate 3-D effect format for the virtual-reality display of the virtual-reality devices.

System 600 can also include other sensors and systems. For example, system 600 can include positional sensors to obtain a user's position and movement. System 600 can include systems for obtaining 3-D audio feeds and integrating said 3-D audio feeds into the 3-D effect video displayed by the virtual-reality device.

Figure 7:
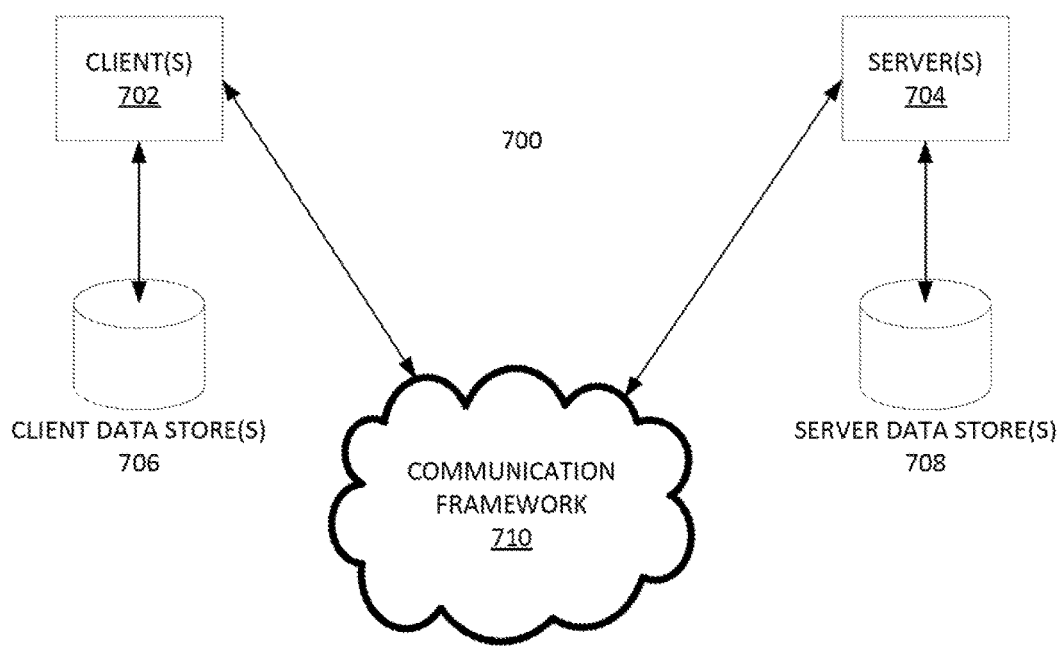
FIG. 7 depicts an exemplary computing system that can be configured to perform any one of the processes provided herein.

FIG. 7 is a block diagram of a sample-computing environment 500 that can be utilized to implement various embodiments. The system 500 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 710 that can be employed to facilitate communications between the client(s) 702 and the server(s) 704. The client(s) 702 are connected to one or more client data store(s) 706 that can be employed to store information local to the client(s) 702. Similarly, the server(s) 704 are connected to one or more server data store(s) 708 that can be employed to store information local to the server(s) 704. In some embodiments, system 700 can instead be a collection of remote computing services constituting a cloud-computing platform.

Exemplary Methods

Described herein is a system and method for embedding parameters pertaining to a stereoscopic 3D video capture device and a 3D video being captured into the recorded video file. Such a stereoscopic 3D camera has at least two lenses and two image sensors. During video capture, metadata such as the camera intrinsic parameters, the parameters of each lens and image sensor, as well as IMU, accelerometer, gyroscopic, location, and other metadata, can be embedded into the video file. Some parameters may be saved in the metadata header of the video file format. Additionally, a system and method is described for extracting such parameters from a stereoscopic video file for use during playback of that file. During playback the parameters may be extracted from the header of the video file as the video is being processed by the stereoscopic video player.

Figure 8:
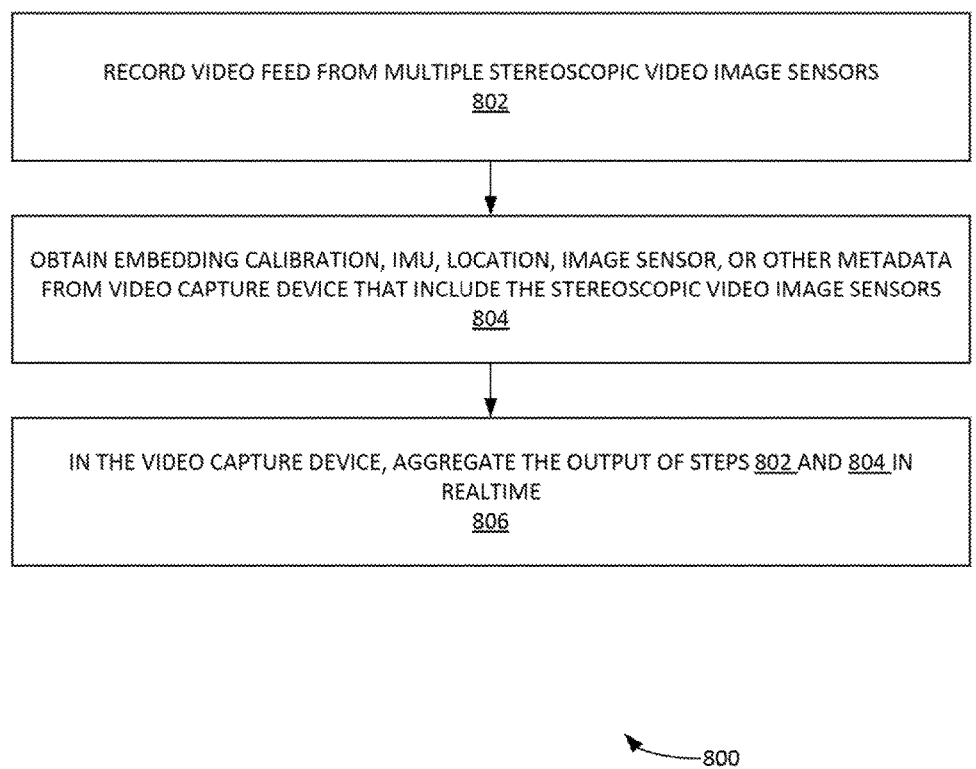
FIG. 8 illustrates an example method of recording stereoscopic 3D video on a stereoscopic camera device, according to some embodiments.

FIG. 8 illustrates an example method of recording stereoscopic 3D video on a stereoscopic camera device, according to some embodiments. In step 802, process 800 can record video feed(s) from multiple stereoscopic video image sensors in a stereoscopic video capture device. These video feeds can be aggregated into a single video sequence. In step 804, process 800 can obtain embedding calibration, IMU, location, image sensor and/or other metadata from stereoscopic video capture device(s) that include the stereoscopic video image sensors. In step 806, in the video capture device, process 800 can aggregate the output of steps 802 and 804 in real time. As used herein, 'real time' can include various latencies (e.g. processing latencies, networking latencies, etc.).

In one example of process 900, the video sequence can be written to a video file on the stereoscopic camera device. The calibration, IMU, location and/or other metadata can be read from the memory of the stereoscopic video capture device (e.g. a fish-eye lens camera, etc.) and embedded into the metadata fields of stereoscopic video file format. Additionally, this metadata can be encoded into the stereoscopic video in a time-dependent fashion by utilizing metadata channels in the video file format, such as subtitle or closed caption metadata fields. In one example, during the processing of each stereoscopic video frame, the metadata specific to each image sensor and/or lens can be read from the memory of the stereoscopic camera device. The metadata from each of the two video lenses can be embedded into the portion of the aggregated stereoscopic video frame that stores the data associated with the image sensor and lens that recorded that portion of the image. The video sequence can be written to a video file on the stereoscopic camera device. Some of the calibration, IMU, location, or other metadata is stored in the metadata of the encoded video file. The remaining metadata can be encoded into the stereoscopic video sequence using subtitle metadata or a table in the metadata header.

Figure 9:
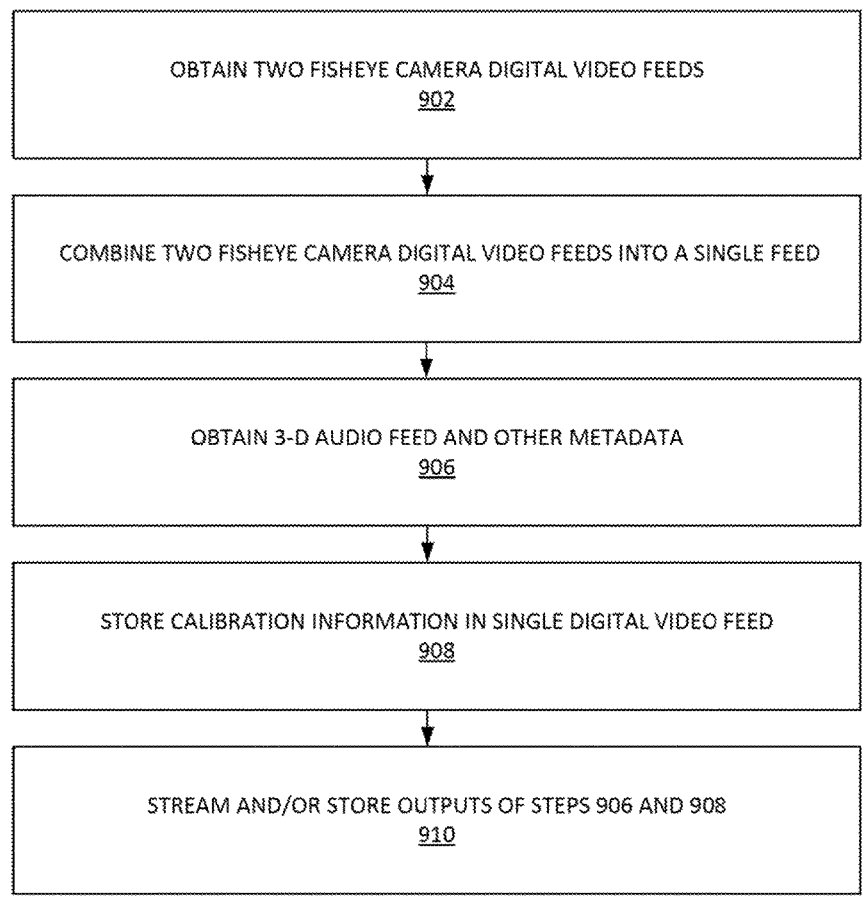
FIG. 9 provides a process of generating a video file with a stereoscopic device, according to some embodiments.

FIG. 9 provides a process 900 of generating a video file with a stereoscopic device, according to some embodiments. Process 900 can obtain two fisheye camera digital video feeds (e.g. from a stereoscopic device with two fisheye cameras) in step 902. Each fisheye lens can record in one-hundred and eighty (180) degrees. In step 904, the two fisheye camera digital video feeds can be interlaced into a single video feed. Optionally, in step 906, 3-D audio feed and other metadata can be obtained. The 3-D audio effect can be obtained from multiple microphones in the stereoscopic device. Example metadata can include, inter alia: user position data such as head position data, user motion data, user location data, stereoscopic device parameters to be used for calibration of the two fisheye camera fees, etc. Accelerometers, gyroscopes, and/or other sensors in the stereoscopic system can be used to provide at least some of the metadata.

In step 908, process 900 can store calibration information in single digital video feed (e.g. In a video file such as an MP4 file). Calibration information can include intrinsic stereoscopic device parameters that are used to replay the video file produced by process 900 with a high-degree of fidelity. Example calibration parameters can be the effects of the fisheye lenses and the distance between the fisheye lenses. The metadata information can be vector of numbers passed on playback software and stored in the video file. In process 910, process 900 can stream and/or store outputs of steps 906 and 908 (e.g. stored in data store 606 of FIG. 6). The video file of process 900 can be used by playback functionalities to provide a 3-D effect in a virtual-reality device (e.g. using process 1000 of FIG. 10 infra).

Figure 10:
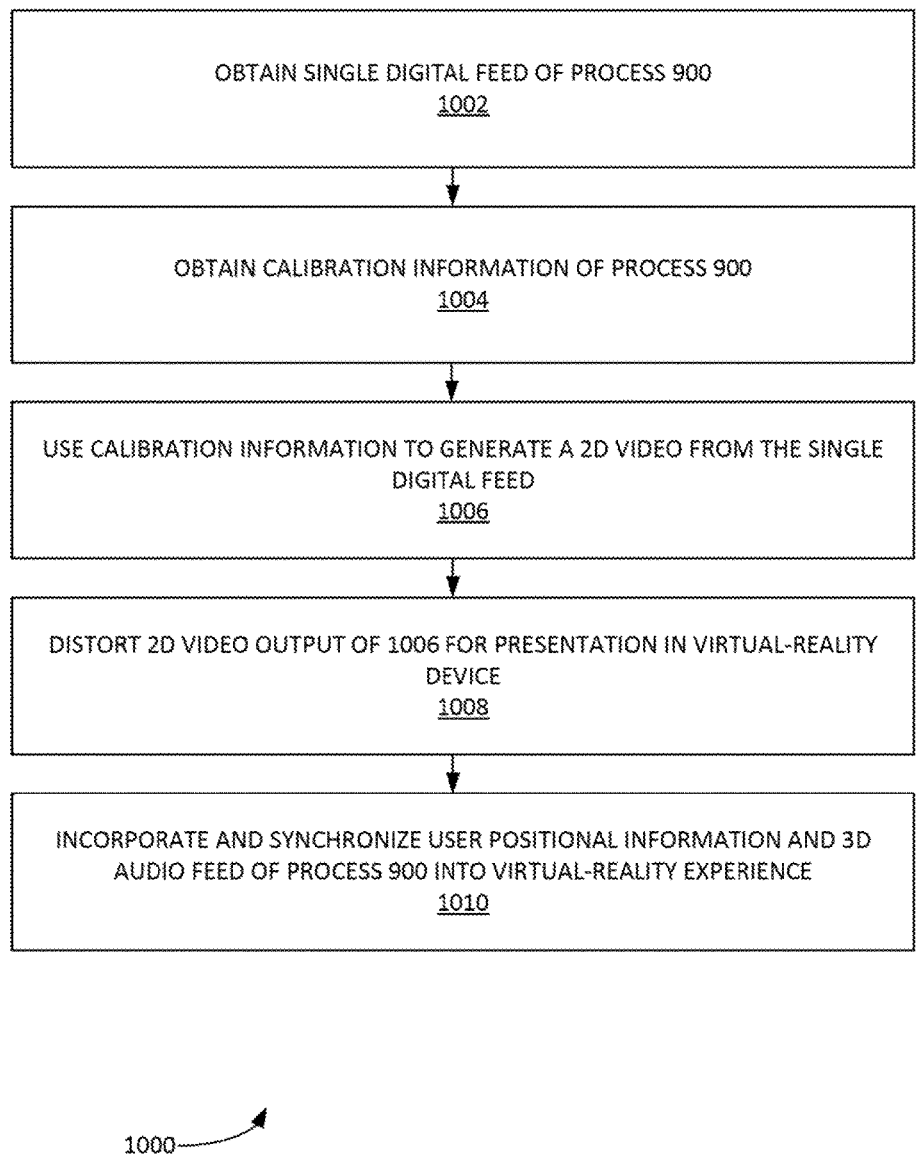
FIG. 10 provides an example process of processing the video file of process for presentation in a virtual-reality device, according to some embodiments.

FIG. 10 provides an example process of processing the video file of process 900 for presentation in a virtual-reality device, according to some embodiments. Process 1000 can be used to play videos recorded with a stereoscopic system in a virtual-reality device. Example virtual devices include, inter alia: Oculus Rift®, Google Cardboard®, and/or other virtual reality headsets, a smartphone, web browser, etc. In step 1002, process 1000 can obtain video file produced by process 900. In step 1004, process 1000 can obtain the calibration information of process 900.

In step 1006, process 1000 can use this calibration information to generate a 2-D video from the single digital feed. The single video stream produced by process 900 can be split into the two separate video feeds of each fisheye lens camera (e.g. a video feed for each of a user's eyes). Graphic rendering operations can be implemented on these video feeds. These graphic rendering operations can undistort the effects of the fisheye lens.

In step 1008, process 1000 can distort the 2-D video output of 1006 for presentation in virtual-reality device. For example, step 1008 can render the 2-D video to include 3-D video effects. In step 1010, process 1000 can incorporate and/or synchronize user positional information and 3D audio feed of process 1000 into virtual-reality experience. In some examples, processes 900 and 1000 can be implemented by firmware in one or more elements of system 600 (e.g. 602 and 608).

Figure 11:
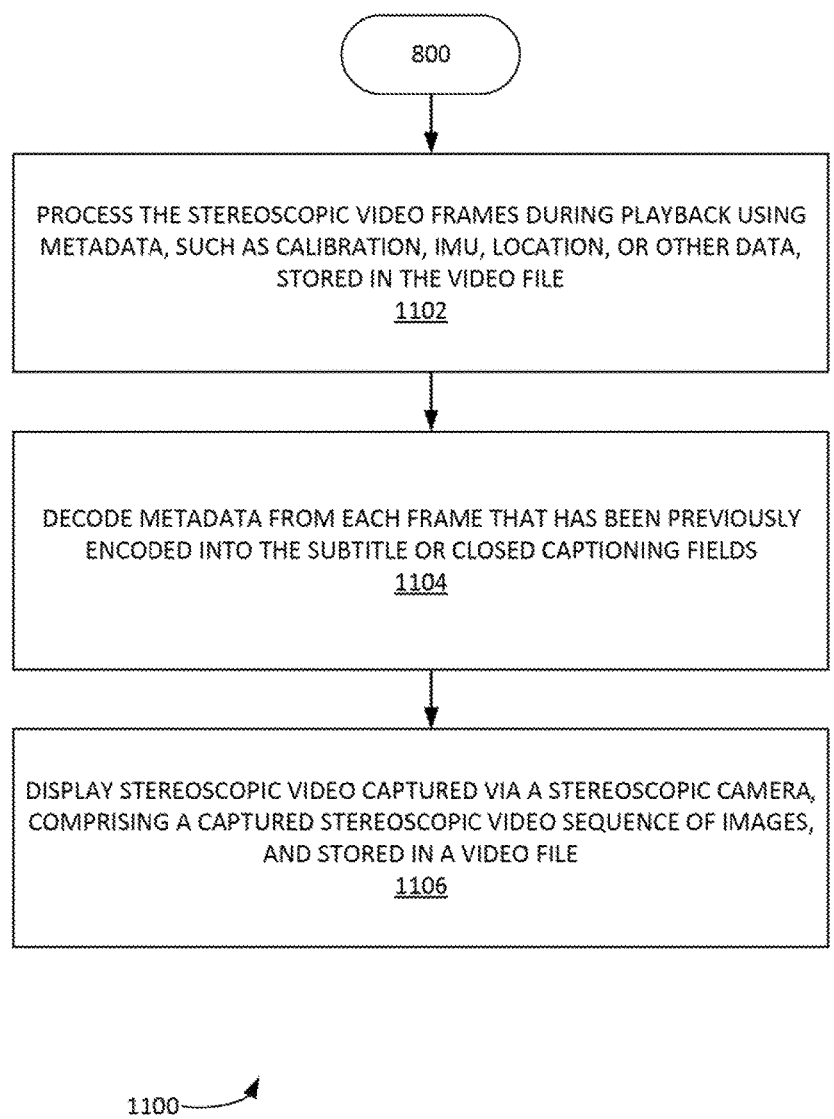
FIG. 11 illustrates an example stereoscopic video processing method process according to some embodiments.

FIG. 11 illustrates an example stereoscopic video processing method process 1100 according to some embodiments. In step 1102, process 1100 can process the stereoscopic video frames during playback using metadata, such as calibration, IMU, location and/or other data, stored in the video file. In step 1104, process 100 can decode metadata from each frame that has been previously encoded into the subtitle or closed captioning fields. In step 1106, process 1100 can display stereoscopic video captured via a stereoscopic camera, comprising a captured stereoscopic video sequence of images, and stored in a video file.

In one example, process 1100 can process the video sequence of stereoscopic images during playback and decoding metadata from each frame that has been previously encoded using subtitle or closed caption metadata. Process 1100 can use the decoded metadata during the rendering of the stereoscopic video sequence.

In another example, process 1100 can process a video sequence of stereoscopic images during playback, where the images were captured on multiple stereoscopic video recording devices. Process 1100 can use the decoded metadata during the rendering of the stereoscopic video sequence, where the meta data of each frame originates from the recording device that captured it.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system for recording stereoscopic three-dimensional (3D) video on a stereoscopic camera device comprising:
   (a) a computer store containing data, wherein the data comprises:
      a stereoscopic video feed of two or more stereoscopic images from a stereoscopic video capture device, and
      a plurality of contemporaneous metadata feeds, wherein a metadata feed comprises a time sequenced set of metadata obtained from a sensor of the stereoscopic video capture device;
   b) a computer processor in the stereoscopic video capture device, which computer processor is coupled to the computer store and programmed to:
      obtain the stereoscopic video feed from the computer store,
      obtain the plurality of contemporaneous metadata feeds from the computer store, and
      embedding, in real-time as the stereoscopic video feed is recorded, the stereoscopic video feed with the plurality of contemporaneous metadata feeds, and wherein the plurality of metadata feeds comprises a calibration metadata of the stereoscopic video capture device contemporaneous with the stereoscopic video feed, wherein the stereoscopic video feed embedded with the plurality of contemporaneous metadata feeds is written by the computer processor to a video file in the stereoscopic video capture device, and wherein the plurality of contemporaneous metadata feeds is embedded into the stereoscopic video feed by encoding the contemporaneous metadata feeds into the subtitles or closed captioning metadata fields of the video file format, such that the timing of the subtitle or closed captioning metadata conveys the timing of the metadata feeds.

2. The computerized system of claim 1, wherein the plurality of metadata feeds comprises an inertial measurement unit (IMU) metadata of the stereoscopic video capture device contemporaneous with the stereoscopic video feed.

3. The computerized system of claim 2, wherein the plurality of metadata feeds comprises a location metadata that provides the location of the stereoscopic video capture device contemporaneous with the obtaining of the stereoscopic video feed, and wherein the location metadata comprises a set of latitude and longitude coordinates of where the stereoscopic video feed was obtained.

4. The computerized system of claim 1, wherein the embedding the stereoscopic video feed with the plurality of contemporaneous metadata feeds is performed on a graphics processing unit (GPU) in the stereoscopic video capture device.

5. The computerized system of claim 4, wherein the computer processor renders the video file into a format for communication to a display device.

6. A computerized system for displaying stereoscopic three-dimensional (3D) video recorded on a stereoscopic camera device comprising:
   (a) a computer store containing data, wherein the data comprises:
      a stereoscopic video feed of two or more stereoscopic images from a stereoscopic video capture device, wherein the stereoscopic video feed comprises a plurality of contemporaneous metadata feeds, wherein a metadata feed comprises a time sequenced set of metadata obtained from a sensor of the stereoscopic video capture device;
   (b) a computer processor in the stereoscopic video capture device, which computer processor is coupled to the computer store and programmed to:
      obtain the stereoscopic video feed from the computer store,
      parse the plurality of contemporaneous metadata feeds from the stereoscopic video feed,
      calibrate the stereoscopic video feed for display in a virtual-reality headset display using the plurality of contemporaneous metadata feeds, and
      decode a metadata stored in the subtitles or closed captioning fields of the stored video file format, wherein the metadata is associated with a set of different times within the video based on the timing of the subtitles or closed captioning fields.

7. The computerized system of claim 6, wherein the computer processor uses the decoded metadata during the rendering of a stereoscopic video sequence for display in the virtual-reality headset.

8. The computerized system of claim 7, wherein the stereoscopic video capture device comprises two or more fish-eyed lens digital cameras in the stereoscopic video capture device.

9. The computerized system of claim 8, wherein the computer processor decodes metadata stored for multiple recording devices during the rendering of a stereoscopic video sequence for display, such that the metadata is associated with particular segments of the video sequence.

10. The computerized system of claim 7, wherein, the computerized system for displaying the stereoscopic 3D content is a mobile phone or tablet device.

11. A computerized system for displaying stereoscopic three-dimensional (3D) video recorded on a stereoscopic camera device comprising:
(a) a computer store containing data, wherein the data comprises:
a stereoscopic video feed of two or more stereoscopic images from a stereoscopic video capture device, wherein the stereoscopic video feed comprises a plurality of contemporaneous metadata feeds, wherein a metadata feed comprises a time sequenced set of metadata obtained from a sensor of the stereoscopic video capture device, and wherein the stereoscopic video capture device comprises two or more fish-eyed lens digital cameras that are used to capture the stereoscopic video feed, wherein the time sequenced set of metadata is encoded into the stereoscopic video in a time-dependent fashion by utilizing a metadata channel in a video file format, and wherein the metadata channel comprises a subtitle metadata field or a closed-caption metadata field;
b) a computer processor in the stereoscopic video capture device, which computer processor is coupled to the computer store and programmed to:
obtain the stereoscopic video feed from the computer store,
parse the plurality of contemporaneous metadata feeds from the stereoscopic video feed, and
calibrate the stereoscopic video feed for display in a display of a user's computing device using the plurality of contemporaneous metadata feeds.

12. The computerized system of claim 11, wherein the user's computing device comprises a virtual-reality headset, a tablet computer or a smartphone.

* * * * *